US011379200B2

(12) United States Patent
Dwars et al.

(10) Patent No.: US 11,379,200 B2
(45) Date of Patent: Jul. 5, 2022

(54) METHOD FOR APPLYING GRAPH-SPECIFIC COMPILER OPTIMIZATIONS TO GRAPH ANALYSIS PROGRAMS

(71) Applicant: Oracle International Corporation, Redwood Shores, CA (US)

(72) Inventors: Martijn Dwars, Kanon (CH); Martin Sevenich, Palo Alto, CA (US); Sungpack Hong, Palo Alto, CA (US); Hassan Chafi, San Mateo, CA (US); Guido Wachsmuth, Kanton (CH)

(73) Assignee: Oracle International Corporation, Redwood Shores, CA (US)

( * ) Notice: Subject to any disclaimer, the term of this patent is extended or adjusted under 35 U.S.C. 154(b) by 188 days.

(21) Appl. No.: 16/776,792

(22) Filed: Jan. 30, 2020

(65) Prior Publication Data

US 2021/0240456 A1 Aug. 5, 2021

(51) Int. Cl.
*G06F 8/41* (2018.01)
*G06F 8/34* (2018.01)
(Continued)

(52) U.S. Cl.
CPC ........... *G06F 8/443* (2013.01); *G06F 8/34* (2013.01); *G06F 8/72* (2013.01); *G06F 9/30065* (2013.01); *G06F 9/30174* (2013.01); *G06F 9/541* (2013.01)

(58) Field of Classification Search
CPC ..... G06F 8/41; G06F 8/34; G06F 8/75; G06F 9/30036; G06F 9/30181; G06F 9/541;
(Continued)

(56) References Cited

U.S. PATENT DOCUMENTS 9,916,187 B2 3/2018 Schmid
9,928,113 B2 3/2018 Sevenich
(Continued)

FOREIGN PATENT DOCUMENTS

WO WO 2016/032616 3/2016

OTHER PUBLICATIONS

Sparsity Technologies, "Sparksee User Manual", API, http://www.sparsity-technologies.com/UserManual/API.html, 61 pages, dated 2015.

(Continued)

*Primary Examiner* — Geoffrey R St Leger
*Assistant Examiner* — Chenega Smith
(74) *Attorney, Agent, or Firm* — Hickman Becker Bingham Ledesma LLP

(57) ABSTRACT

Techniques are described for compiling source code to generate graph-optimized intermediate representation instructions of the source code that implement techniques for optimizing algorithms for graph analysis. A compiler, executing on a computing device, receives source code instructions for a program to be compiled. The compiler identifies a target expression, within the source code instructions, that invokes a particular method call on a particular object type. The target expression contains a target block of code to be translated into an intermediate representation using graph-optimized compilation techniques. The compiler generates a block of graph-specific intermediate representation instructions to replace the target expression. The compiler compiles the source code instructions to generate intermediate representation instructions, where the intermediate representation instructions include the block of graph-specific intermediate representation instructions in place of the target expression.

20 Claims, 4 Drawing Sheets

(51) Int. Cl.
  *G06F 8/72* (2018.01)
  *G06F 9/30* (2018.01)
  *G06F 9/54* (2006.01)
(58) Field of Classification Search
  CPC ........ G06F 8/443; G06F 8/72; G06F 9/30065; G06F 9/30174
  See application file for complete search history.

(56) References Cited

U.S. PATENT DOCUMENTS

| | | | |
|---|---|---|---|
| 10,127,025 B2 | 11/2018 | Sevenich | |
| 10,409,560 B1* | 9/2019 | Bebee | G06F 8/71 |
| 2005/0268293 A1* | 12/2005 | Kawahito | G06F 8/4434 717/154 |
| 2006/0212862 A1* | 9/2006 | Nesbitt | G06F 8/443 717/151 |
| 2011/0265067 A1* | 10/2011 | Schulte | G06F 9/45516 717/148 |
| 2013/0006935 A1 | 1/2013 | Grisby | |
| 2015/0347108 A1 | 12/2015 | Munshi | |
| 2016/0139894 A1* | 5/2016 | Slesarenko | G06F 9/4552 717/144 |
| 2016/0140152 A1* | 5/2016 | Sevenich | G06F 16/2228 707/755 |
| 2017/0024194 A1* | 1/2017 | Sevenich | G06F 8/443 |
| 2017/0249130 A1 | 8/2017 | Smiljanic | |
| 2018/0107463 A1* | 4/2018 | Heilbrunn | G06F 21/563 |
| 2018/0157471 A1* | 6/2018 | Venkataramani | G06F 8/452 |
| 2019/0042661 A1 | 2/2019 | Sevenich | |
| 2020/0133744 A1* | 4/2020 | MacLeod | G06K 9/6885 |

OTHER PUBLICATIONS

Hong et al., "Green-Marl: A DSL for Easy and Efficient Graph Analysis", ASPLOS'12 Mar. 3-7, 12, 2012, London, England, UK, 14 pages.
Freeman, Eve, "Getting Started with Neo4j and Cypher", https://www.airpair.com/neo4j/posts/getting-started-with-neo4j-and-cypher, dated Oct. 2016, 12 pages.
Flores et al., "Semantic Data Management in Graph Databases", Tutorial at ESWC 2014-, dated 2014, 153 pages.
Zhang et al., "GraphIt: A High-Performance Graph DSL", Proc. ACM Program. Lang. 2, OOPSLA, Article 121, https://doi.org/10.1145/3276491, dated Nov. 2018, 30 pages.
Sevenich et al., "Using Domain Specific Languages for Analytic Graph Databases", Proceedings of the VLDB Endowment, vol. 9, No. 13, http://www.vldb.org/pvldb/vol9/p1257-sevenich.pdf, dated 2016, 12 pages.
Paradies et al., "Graphscript: Implementing Complex Graph Algorithms in SAP HANA", https://www.researchgate.net/publication/319370706_GraphScript_implementing_complex_graph_algorithms_in_SAP_HANA, dated Sep. 2017, 5 pages.
Karakoidas et al., "J%: Integrating Domain Specific Language with Java", PCI 2009: 13th Panhellenic Conference on Informatics, https://www.researchgate.net/publication/221565532_J_Integrating_Domain_Specific_Languages_with_Java, Sep. 2009, 7 pages.

* cited by examiner

METHOD FOR APPLYING GRAPH-SPECIFIC COMPILER OPTIMIZATIONS TO GRAPH ANALYSIS PROGRAMS

FIELD OF THE INVENTION

The present invention relates, generally, to compiler optimizations and, more specifically, to techniques for generating IR instructions optimized for graph processing.

BACKGROUND

A compiler is a computer program that translates source code conforming to a programming language into object code conforming to another language. In many instances, the object code is machine code that can be directly executed by a physical machine, such as a central processing unit (CPU). For example, the object code may include a set of binary instructions that can be directly loaded and executed by the CPU. The object code is typically much more difficult for a human user to read and understand than the programming language code, but enables that target machine to carry out the instructions specified in the source code.

Graph analysis is a subfield of data analysis that encompasses systems and methods for analyzing datasets modelled as graphs. A graph in this context represents an underlying dataset that it is organized into a set of data entities and connections. The data entities are referred to as nodes or vertices of the graph, and the connections between data entities are referred to as edges of the graph. Other information in the underlying dataset may be encoded as node or edge properties. Using this model, a graph may capture fine-grained, arbitrary relationships between different data entities within the underlying dataset. Graphs can be used to model a wide variety of systems and relationships including, without limitation, communication networks, linguistic structures, social networks, data hierarchies, and other physical or virtual systems. For instance, a node within a graph may represent a person in the underlying dataset with node properties representing social security number, name, address, etc. The edges may represent connections between people, with edge properties capturing the strength of connection, a source of the connection etc. Other entities and connections may also be represented depending on the particular application. By analyzing relationships captured by a graph, data scientists, applications, or other users can obtain valuable insights about the original dataset.

However, implementing graph analysis algorithms in an efficient manner is a challenge as many graph algorithms suffer performance problems related to the translation of the programming language into object code. Compilers may not implement graph-specific optimizations for graph analysis algorithms and as a result, the generated executable code for such algorithms may perform inefficiently. One such solution is to implement domain-specific languages (DSLs), which allow developers to express graph algorithms at a high level of abstraction, such that the compiler has more flexibility when optimizing the lower-level implementation. Such flexibility allows the compiler to generate more optimized object code which increases efficiency during runtime.

Implementations of DSLs may include either internal DSLs or external DSLs. External DSLs are independent domain specific languages which allow the user the freedom to define their own syntax. However, grammar and parsing syntax for an external DSL must be defined and implemented. For example, a customized compiler needs to be generated in order to compile source code for the external DSL.

Internal DSLs, on the other hand, represent domain specific languages implemented using an existing host language. That is, internal DSLs leverage the syntax of the host language. One advantage to using an internal DSL is that the source code can be compiled based on a compiler for the host language without having to define new rules for the compiler. However, internal DSLs are restricted by the syntax and optimization constraints associated with the host language. For example, if a developer writes source code in an internal DSL based on Java, then compiling and optimizing executable code for the internal DSL is limited to optimizations performed by the Java compiler. For instance, a for-loop in an internal DSL or in Java may include the following:

for (Object x:xs) {body} when compiled by the compiler, the IR instructions would include instructions to iterate through xs sequentially, which is less efficient than processing xs in parallel.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are novel techniques for compiling source code to generate graph-optimized intermediate representation (IR) instructions of the source code that implement techniques for optimizing algorithms for graph analysis. An IR is code instructions used internally by a compiler or virtual machine to represent the source code. For example, IR instructions may represent bytecode. These techniques can be applied to source code written in conventional programming languages, which do not typically optimize the IR instructions for graph analysis algorithms, without the need to include, in the source code, explicit instructions to perform graph analysis algorithms. The following techniques reduce the need for providing explicit instructions to perform the graph analysis algorithms.

The techniques enable developers to instruct compilers to optimize and generate IR instructions for graph processing using specific object types and methods defined in a graph optimization application programming interface (API). In an embodiment, a compiler, executing on a computing device, receives source code instructions for a program to be compiled. The source code instructions may be written in any DSL that is enabled with the graph optimization API. The compiler is configured to identify a target expression, within the source code instructions, that invokes a particular method call on a particular object type. The graph optimization API may define the particular method call and the particular object type within the target expression. The target expression includes a target block of code that is eligible for graph-specific compiler optimization. For example, the target block of code may be defined as an input parameter for the particular method call invoked. Upon identifying the target expression, the compiler generates a block of graph-specific IR instructions to replace the target expression. In an embodiment, the graph-specific IR instructions may include instructions to create multiple threads for executing the target block of code in parallel, instructions for managing the multiple threads, and/or handling race conditions between the multiple threads.

In an embodiment, the compiler may compile the entire set of source code instructions to generate IR instructions representing the program. The IR instructions may include instructions compiled using compiler optimization techniques and the graph-specific IR instructions compiled using graph-optimized compilation techniques.

System Architecture

Figure 1:
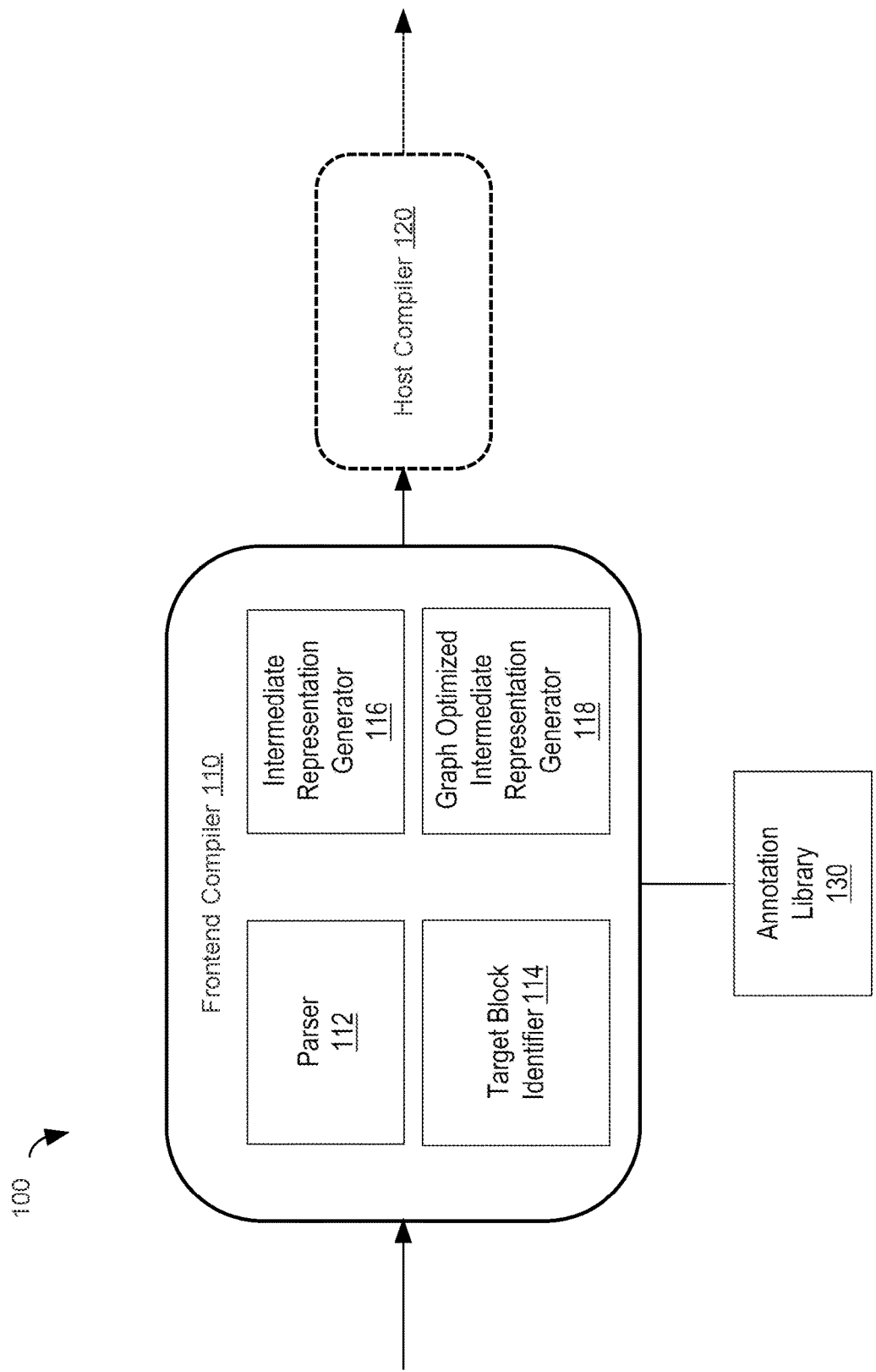
FIG. 1 is a block diagram illustrating a system architecture that includes a frontend compiler, a host compiler, and an annotation library, according to an embodiment of the present invention.

FIG. 1 is a block diagram illustrating a system architecture that includes a frontend compiler 110, a host compiler 120, and an annotation library 130. System 100 may represent a computing device such as a server, personal computer, laptop, or any other computing device configured with a compiler. The frontend compiler 110 is configured to receive source code for a program to be compiled and generate an IR instructions of the program, such as bytecode. Bytecode represents low-level code representation of the program. Unlike human-readable source code, bytecode comprises numeric codes, constants, and references that encode results of compiler parsing and semantic analysis. In an embodiment, the generated IR instructions are machine independent and can be further compiled into central processing unit (CPU) specific machine code using the host compiler 120.

The host compiler 120 represents a computing device specific compiler configured to input the IR instructions of the program and output computing device specific machine code. In some cases the host compiler 120 may be part of a system configured to execute the program by receiving the IR instructions of the program, such as bytecode, and executing the bytecode by dynamically converting the bytecode into native machine code and executing the native machine code. In one example, the host compiler 120 may be part of a virtual machine (VM), such as a Java Virtual Machine (JVM), which is configured with a "just-in-time" (JIT) compiler that dynamically converts bytecode into native machine code and subsequently executes the native machine code.

In an embodiment, the frontend compiler 110 comprises a parser 112, a target block identifier 114, an IR generator 116, and a graph optimized IR generator 118. The parser 112 is configured to analyze each of the lines of input source code and build a data structure to represent the input source code. The data structure generated may be a parse tree or an abstract syntax tree. In an embodiment, the parser 112 may implement several different forms of code analysis and parsing. For example, the parser 112 may implement a lexical analyzer, syntactic analyzer, and/or semantic parser. The lexical analyzer may be configured to receive the input source code as a stream of input string characters and produce tokens that represent meaningful expressions from the input source code. The syntactic analyzer may be configured to use context-free grammar to define algorithmic procedures and components to be used to translate the input source code. Semantic parsing involves analyzing identified expressions to determine what actions are supposed to be taken. The parser 112 may, for example, generate an abstract syntax tree representing identified expressions and their corresponding structure within the input source code.

Target Block Identifier

The target block identifier 114 is configured to identify blocks of source code tagged for graph-specific compiler optimizations. Graph-specific compiler optimizations represent transforming blocks of source code into IR instructions that utilize specific algorithms optimized for graph analysis. For example, graph-specific compiler optimizations may include transforming a for-loop of source code instructions into IR instructions that are performed using multiple threads, in parallel, to execute the source code instructions. In another example, the graph-specific compiler optimizations may include determining that source code instructions within multiple for-loops may be combined together into a single for-loop for optimized graph analysis. Without implementing graph-specific compiler optimizations, a compiler may translate the block of code into IR instructions that iterate through the elements of a for-loop sequentially, rather than in parallel. Sequential iteration of a for-loop for graph analysis may result in IR instructions that are not optimized for efficient graph analysis.

In an embodiment, target block identifier 114 is configured to identify patterns within the source code that invoke specific method calls on specific object types in order to identify a block of code that should be compiled using graph-specific optimizations. The target block identifier 114 may be configured to analyze the abstract syntax tree or parse tree, generated by the parser 112, and identify patterns in the source code based on the tree. In another embodiment, the target block identifier 114 may analyze the source code directly. The following is an example target pattern of an expression identified by the target block identifier 114 that includes a block of code to be compiled using graph-specific compiler optimization techniques:

g.getVertices( ).forEach(v→{ . . . });

where "g" is a variable having an object type of PgxGraph and the getVertices( ) method of object type PgxGraph is a specific method that returns a specific object type of VertexSet. VertexSet is a special object type that serves as a marker for graph-specific compiler optimization. The VertexSet object has two method calls, "forEach(Callable<T>)" and "forSequential(Callable<T>)". The forEach (Callable<T>), when present in the source code and invoked by a special object type serves as a marker for identifying a target block of code that should be executed in parallel using multiple threads. In this example, the java lambda expression "v→{ . . . }" is used to identify the target block of code, represented by the ellipses. The target block identifier 114 identifies the target block of code to be optimized using graph-specific optimizations and the graph optimized intermediate representation (IR) generator 118 generates IR instructions that will execute the target block of code in parallel for each vertex in the set of vertices.

In an embodiment, different target expressions that are used to mark target blocks of code to be graph optimized may indicate what type of optimization algorithm should be used for optimization. For example, if the target expression invoked on a specific object type is the forEach (Callable<T>) method call with a lambda expression of "v→{System.out.println(age.get(v))};" then the graph optimized IR generator 118 may generate graph optimized IR instructions that include spawning multiple threads to execute the target block of code in parallel.

In another example, if the target expression invoked on a specific object type is the forSequential(Callable<T>) method with the same lambda expression as above, then the graph optimized IR generator 118 may generate IR instructions that iterate through each element and sequentially execute the target block of code.

In an embodiment, the target expression recognized by the target block identifier 114 may include more or less parameters. For instance, the target block identifier 114 may be configured to identify a specific object type that invokes a specific method call, which includes a specific input parameter, such as an anonymous function. An example of an anonymous function is a Java lambda expression. A Java lambda expression is a special java functional interface that implements an anonymous abstract function. An example lambda function is:

v→System.out.println(v)

where "v" is the input parameter for the lambda function that executes the "System.out.println(v)" expression on input parameter "v". Additional parameters of the target expression are not limited to anonymous functions. The target expression may be defined with more or less parameters.

In an embodiment, the target block identifier 114 is configured to determine patterns for target expressions based upon the annotation library 130. The annotation library 130 contains the collection of interface definitions for the graph-optimized API. An example of an interface defined in the annotation library 130 is the object class PgxGraph. The class PgxGraph includes the following methods:

```
Class: PgxGraph
    Methods:    long getNumVertices( )
                long getNumEdges( )
                VertexSet getVertices( )
                EdgeSet getEdges( )
                PgxVertex getRandomVertex( )
```

Each of the methods getVertices( ), getEdges( ), and getRandomVertex( ) returns special object types VertexSet, EdgeSet, and PgxVertex, respectively. The special object types VertexSet, EdgeSet, and PgxVertex are also defined in the graph-optimized API and each contain special method calls, which when invoked, form a target expression pattern identified by the target block identifier 114. The target block identifier 114 may maintain a set of target expressions based upon interfaces and methods defined in the graph-optimized API.

In an embodiment, target expressions and corresponding rules for generating IR instructions are stored within computer memory of the computing device. Different types of target expressions may have different rules for generating IR instructions. For instance, if the target expression contains the special method call forEach(<target code block>), then the rules corresponding to this target expression may specify generating IR instructions for creating multiple threads for executing the target code block in parallel. If however, the target expression contains the special method call forSequential(<target code block>), then the rules corresponding to this target expression may specify generating IR instructions for executing the target code block for each element in a collection sequentially. The following is an illustrative example of compiler based rules for identifying a target expression and generating a corresponding IR instructions:

```
java-to-gm-statement:
    java |[ x_graph.getVertices( ).forEach(e_body}; ]| -> {...}
    where
        <get-type; is-graph-type> x_graph
    with
        x_iterator    := <lambda-argument> e_body
        s_body        := <lambda-body; java-to-gm-statement> e_body
``` where, the target block identifier 114 matches the target expression pattern of "x_graph.getVertices( ).forEach(e_body)". The x_graph placeholder represents an object that has a graph object type. The e_body placeholder represents a lambda expression, which is the target block of code to be executed using graph-specific optimization. For example, the e_body may represent a lambda expression such as "v→System.out.println(v)". The ellipses represent where instructions for generating the IR instructions would be found. For instance, the ellipses would be where rules or IR instructions for generating multiple threads would be stored. In an embodiment, upon identifying a target expression and the corresponding target block code, the target block identifier 114 may label the target expression for graph-specific compiler optimization during the IR instruction generation stage. In another embodiment, upon identifying a target expression and the corresponding target block code, the target block identifier 114 may send a request to the graph optimized IR generator 118 to generate corresponding IR instructions for the target block of code. The graph optimized IR generator 118 may use the compiler based rules to generate blocks of IR instructions to be inserted in place of the target expression in the generated IR instructions.

Graph Optimized Intermediate Representation Generator

The graph optimized IR generator 118 is configured to generate corresponding IR instructions that represents compiled and optimized program code for a target expression containing the target block of code. In an embodiment, the graph optimized IR generator 118 may receive a request from the target block identifier 114 that includes the target block of code to be translated using a graph optimized compiler algorithm. The request may also contain the target expression identified by the target block identifier 114. The graph optimized compiler algorithm may be represented by instructions specified within compiler based rules stored in computer memory. Using the java-to-gm-statement example:

```
java |[x_graph.getVertices( ).forEach(e_body); ]| -> {...}
where
    <get-type; is-graph-type> x_graph
with
    x_iterator    := <lambda-argument> e_body
    s_body        := <lambda-body; java-to-gm-statement> e_body
``` the graph optimized IR generator 118 would interpret the compilation instructions, represented by the ellipses, to generate graph optimized IR instructions that contains the target block of code, represented by e_body. For instance, the compilation instructions may specify instructions to create multiple threads to execute, for each element, the target block of code (e_body).

In an embodiment, the graph optimized IR generator 118 does not explicitly translate the target expression into corresponding IR instructions, but rather uses the compilation instructions to generate the IR instructions for starting and managing new threads, managing race conditions, and any other specific compilation instructions. In an embodiment, the graph optimized IR generator 118 translates the target block of code into corresponding IR instructions.

For example, if the target expression and target block of code are represented as "g.getVertices( ).forEach (v→{System.out.println(v)})" where the target expression is "g.getVertices( ).forEach( )" then the graph optimized IR generator 118 would replace the target expression with generated IR instructions that creates and manages multiple threads for the target block of code "System.out.println(v)". The graph optimized IR generator 118 would then translate the target block of code of "System.out.println(v)" into corresponding IR instructions. The output from the graph optimized IR generator 118 would be a block of IR instructions that is optimized for graph processing based on the graph optimization. The graph optimized IR generator 118 is configured to store the generated blocks of IR instructions in memory.

In an embodiment, during compilation of the remainder of the input source code by the IR generator 116, the graph optimized IR generator 118 may receive requests, from the IR generator 116, for the blocks of IR instructions to be inserted into other IR instructions that has been compiled by the IR generator 116. In another embodiment, the graph optimized IR generator 118 may generate the block of IR instructions, on demand, in response to receiving a request from the IR generator 116. In this example, the IR generator 116 may generate and send a request that includes the target expression and the target block of code to be translated using a graph optimized compiler algorithm. The graph optimized IR generator 118 generates the block of IR instructions and sends the block to the IR generator 116.

In an embodiment, a request to generate a block of IR instructions using a graph optimized compiler algorithm may include two or more target blocks of code to be compiled. For example, the IR generator 116 may generate a request that contains two or more target blocks of code. This may occur if the two or more target blocks of code are part of a larger block of code in which computations of object values may involve assignments across portions of the two or more target blocks of code. For example, the following block of code contains multiple target expressions and multiple target blocks of code:

```
g.getVertices( ).forEach(v -> {
    if (v.hasLabel("person")) {
        if (age.get(v) < 30) {
            v.getInNeighbors( ).forEach(w -> {
                System.out.printlin(name.get(w));
            });
        } else {
```

-continued

```
            v.getOutNeighbors( ).forEach(w -> {
                System.out.println(name.get(w));
            });
        }
    }
});
``` where the first target expression "g.getVertices( ).forEach" contains two other target expressions "v.getInNeighbors( ).forEach" and "v.getOutNeighbors( ).forEach". The graph optimized IR generator 118 is configured to analyze the multiple target blocks of code, within the multiple target expressions, and generate graph optimized IR instructions that contain the multiple target blocks of code. Additionally, the graph optimized IR generator 118 may analyze the multiple loops and determine whether the multiple loops should be combined into a single loop that contains the instructions from the multiple target blocks of code. This compiler optimization technique is called loop fusion, where multiple loops are transformed into a single loop. The bytecode generator 118, upon generating IR instructions that contains either multiple loops or a single loop, may be sent to the IR generator 116 to be inserted into other IR instructions representing to the compiled program. Embodiments, of sending a request, that includes two or more target blocks of code, is not limited to the IR generator 116. The target block identifier 114 may identify two or more related target expressions that contain the two or more target blocks of code and may send a single request containing the two or more target expressions to the graph optimized IR generator 118.

Error Checking

In an embodiment, prior to translating the target block of code into IR instructions, the graph optimized IR generator 118 is configured to analyze the target block of code for instructions that may cause potential runtime errors and/or other errors related to graph analysis. For example, if the target block of code contains a java synchronized block, then the instructions to create multiple threads and execute the target block of code in parallel may be rendered inefficient because synchronization of the multiple threads only allows one thread to process the instructions in the target block of code at one time. Java synchronized blocks that are synchronized on the same object means that only one thread may be executed at one time. The other threads attempting to execute the synchronized block wait until the current thread executing the synchronized block finishes. That is, if the target block of code, which is to be executed by multiple threads in parallel contains a synchronize statement, then the threads will not be executed in parallel, thereby compromising the point of compiling the target block of code using graph-specific optimizations.

The graph optimized IR generator 118 may maintain, within memory, a blacklist of source code statements that have been identified as not allowed for graph-specific optimization. For example, the blacklist may contain the following source code statements that are not allowed to be part of the target block of code to be translated by the graph optimized IR generator 118:

Try, throw, and catch statements
For loops (regular and enhanced)
Switch statements
Synchronized statements
Labeled statements
Assert statements The above list of source code statements is a representative example list. Blacklists may contain either more or less source code statements than listed above. Additionally, the blacklist may contain instructions identifying specific types of source code statements. For instance, assignment statements that contain an assignment on the right hand side of the statement are not allowed. Instead, assignment statements are allowed if the object is invoked using a ".clone( )" method. For example, the following assignment statement would not be allowed:

TestObject ob2=ob1;

where "ob1" is an already instantiated TestObject. The above assignment statement creates a new reference variable "ob2" that points to the same address of "ob1". This type of assignment statement is not desirable within a target block of code to be executed in parallel by multiple threads because changes to the value of "ob2" would change the value at the address referenced by "ob1", which may be referenced by the other threads. If the assignment statement is written using a .clone( ) method, such as:

TestObject ob2=(TestObject)ob1.clone( );

then the assignment of "ob2" is a creation of a copy of "ob1" where the value of "ob1" is passed to "ob2" and stored in a new address location. Using the .clone( ) ensures that changes to the value of "ob2" does not interfere with the value of "ob1". Other examples of source code statements that may be disallowed by the blacklist may include creating an instance of an arbitrary class using the "new" construct. Rather, developers may use source code instructions, within the target block of code, that invokes a static ".create( )" method in order to instantiate the new class.

In an embodiment, the graph optimized IR generator 118 may maintain a whitelist of approved source code statements that are allowed to be compiled using a graph optimized compilation algorithms. The whitelist may be a configurable list of source code statements that a software engineer or architect may specify within the computer system. Source code statements within the whitelist may override source code statements in the blacklist. This may occur if the software engineer or architect desires to experiment with source code statements previously not allowed by the graph optimized IR generator 118.

Bytecode Generation

In an embodiment, the IR generator 116 is configured to analyze the input source code and translate the input source code into generated IR instructions. Specifically, the IR generator 116 may analyze the abstract syntax tree generated by the parser 112 and generate IR instructions corresponding to the input source code. The IR instructions may be bytecode that may then be further processed by the host compiler 120. As described, the host compiler 120 may represent an executable program and compiler, such as a JVM, that generates platform dependent machine code and subsequently executes the platform dependent machine code on the computing system.

The IR generator 116 may optimize and generate the intermediate code based on optimization algorithms specified in the IR generator 116. For example, if the frontend compiler 110 is a Java compiler, then the IR generator 116 may implement Java bytecode optimization algorithms to generate the corresponding bytecode. During analysis of the input source code the IR generator 116 may identify the target blocks of code previously marked by the target block identifier 114. The IR generator 116 may then request specific IR instructions corresponding to the target block of code from the graph optimized IR generator 118. In an embodiment, the graph optimized generator 118 may have previously compiled corresponding blocks of IR instructions for each instance of target blocks of code identified. When a request for graph optimized IR instructions is received, the graph optimized IR generator 118 may retrieve the corresponding block of IR instructions, from memory, and provide the block of IR instructions to the IR generator 116. The IR generator 116 may then insert the block of IR instructions into other compiled IR instructions at the location corresponding to the target expression.

The output of the IR generator 116 is IR instructions representing the input source code that contains blocks of IR instructions optimized for graph analysis. The output IR instructions may then be stored in memory for further compilation and execution by the host compiler 120.

Graph Optimization Application Programming Interface

In an embodiment, a graph optimization API may be provided to application developers for use when generating application program source code that contains blocks of code to be compiled using graph-specific optimizations. The graph optimization API represents a specific library of interfaces that when called within source code are used to identify a block of code that is to be compiled using graph-specific optimizations. For example, the graph optimization API may include interfaces for object types such as PgxGraph, PgxVertex, and PgxEdge, each of which contains special method calls that are used as a signal to the target block identifier 114 that the embedded block of code should be compiled using graph optimized algorithms.

The graph optimized API includes interfaces for object types listed in Appendix A. However, the graph optimized API is not limited to the object types listed in Appendix A and may include more or less interfaces. Each of the interfaces represent classes and methods which have not been implemented and are abstract by default. For example, interface PgxGraph as defined in the graph optimized API contains a set of method calls with object type outputs but do not contain code implementing each of the methods. When a developer writes source code that calls methods defined by the graph optimized API, the frontend compiler 110, identifies method calls specified by the graph optimized API and determines that the embedded block of code is to be rewritten using graph optimized IR instructions. For example, if the source code contains the following:

g.getVertices( ).forEach(v→{
    System.out.println(age.get(v));} where g is a PgxGraph object type. The target block identifier 114 identifies that "g.getVertices( )" returns "VertexSet" object type. The VertexSet object is identified as marking a block of embedded code for graph optimization when the VertexSet object calls the forEach( ) method call. The target block identifier 114 identifies the "g.getVertices( ).forEach" as a specific method call made by a VertexSet object which is identified as a target expression meaning that the block of code "System.out.println(age.get(v));" should be compiled using a graph optimized parallel processing algorithm.

Processing Overview

Figure 2:
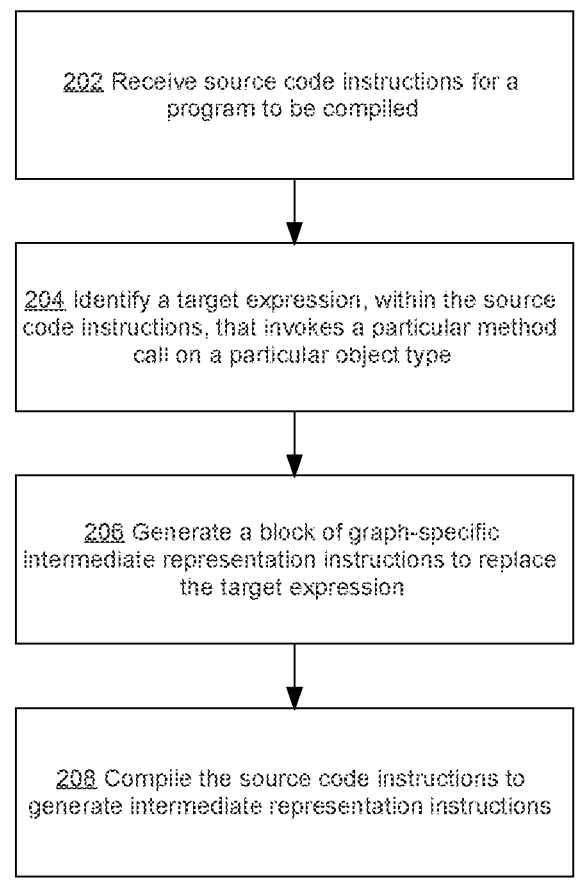
FIG. 2 is a flowchart illustrating a process for compiling source code instructions for a program to generate graph optimized intermediate representation instructions for the program, according to an embodiment of the present invention.

FIG. 2 is a flowchart illustrating a process for compiling source code instructions for a program to generate graph optimized intermediate representation instructions for the program, according to an embodiment. Operations depicted in FIG. 2 may be performed by the frontend compiler 110. At block 202, the frontend compiler 110 receives source code instructions for a program to be compiled. In an embodiment, the frontend compiler 110 may receive the source code instructions as input to executing a compiler. For example, a Java compiler may receive the source code instructions as a ".java" file which is provided as an input parameter to a Java compiler program.

In an embodiment, upon receiving the source code instructions, the parser 112 may implement analyzers to parse the source code instructions and generate a data structure that represents the source code instructions. For example, the data structure generated may be an abstract syntax tree representing identified expressions and their corresponding structure within the input source code.

At block 204, a target expression is identified, within the source code instructions, that invokes a particular method call on a particular object type. In an embodiment, the target block identifier 114 identifies, within the source code, a target expression that is made up of the particular object type invoking the particular method call. For example, the target block identifier 114 may identify the target expression as g.getVertices( ).forEach(v→{ . . . });

where "g.getVertices( )" represents the particular object type of VertexSet and the "forEach" method call represents the particular method call. In an embodiment, the target expression contains a target block of code that is eligible for graph-specific compiler optimization. For instance in the current example, the target block of code is represented by "v→{ . . . }".

At block 206, a block of graph-specific IR instructions to replace the target expression is generated. In an embodiment, the graph optimized IR generator 118 receives a request to generate the block of graph-specific IR instructions from the target block identifier 114. The graph optimized IR generator 118 uses compiler based rules, stored in computer memory, to determine how to generate the block of graph-specific IR instructions. For example, the compiler based rules may specify the format of the target expression and corresponding graph optimized IR instruction rules to generate the graph optimized IR instructions for the target expression. The request for the graph optimized IR generator 118 may include the target block of code to be translated by the graph optimized IR generator 118. The block of graph-specific IR instructions, once generated, may be stored within memory and later provided to the IR generator 116 during source code compilation. In another embodiment, the graph optimized IR generator 118 may receive a request to generate and provide the block of graph-specific IR instructions to the IR generator 116 on demand.

At block 208, the source code instructions are compiled to generate the IR instructions that represent the program. In an embodiment, the IR generator 116 compiles the source code by analyzing the abstract syntax tree generated by the parser 112. The IR generator 116 may analyze a subset of the of the source code instructions to determine whether the subset of source code instructions contains a target expression. For example, the abstract syntax tree may contain a property value that indicates whether a node in the tree has been marked for graph optimization by the target block identifier 114. If the subset contains the target expression, then the IR generator 116 may request the corresponding block of graph-specific IR instructions from the graph optimized IR generator 118. In response, the graph optimized IR generator 118 may provide the corresponding IR instructions to the IR generator 116. If however, the subset does not contain the target expression, then the IR generator may generate a block of IR instructions by translating the subset of source code instructions using compilation algorithms programmed into the IR generator 116. The IR generator 116 iterates over the remaining subsets of the source code instructions until corresponding IR instructions have been generated for each of the remaining subsets.

In an embodiment, the IR generator 116 compiles the corresponding IR instructions, which includes blocks of graph optimized IR instructions as well as block of IR instructions, to generate a set of IR instructions that represent the program. The set of IR instructions may be stored in memory of the computing device for machine specific compilation and execution by the host compiler 120.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
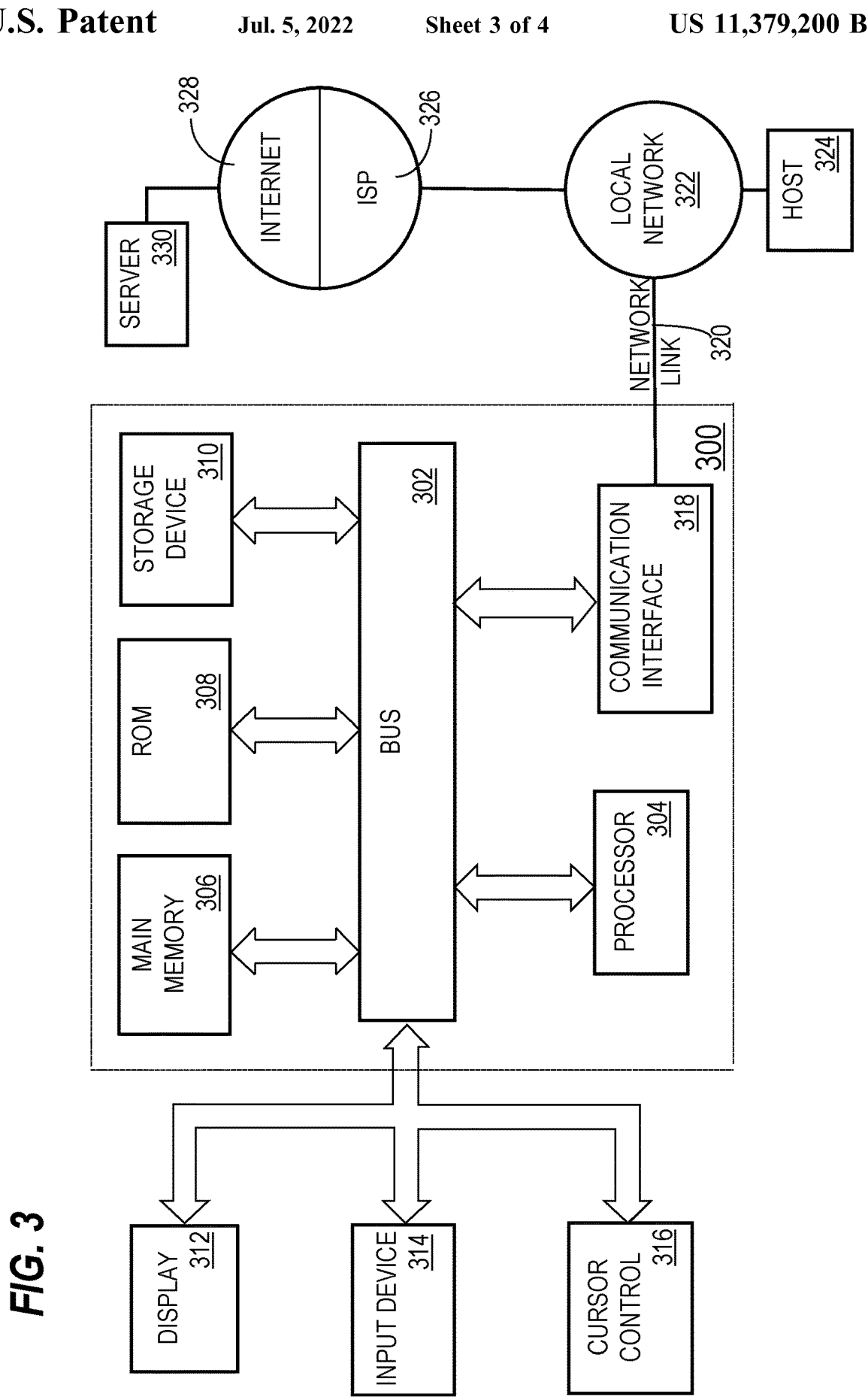
FIG. 3 is a block diagram depicting a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 4:
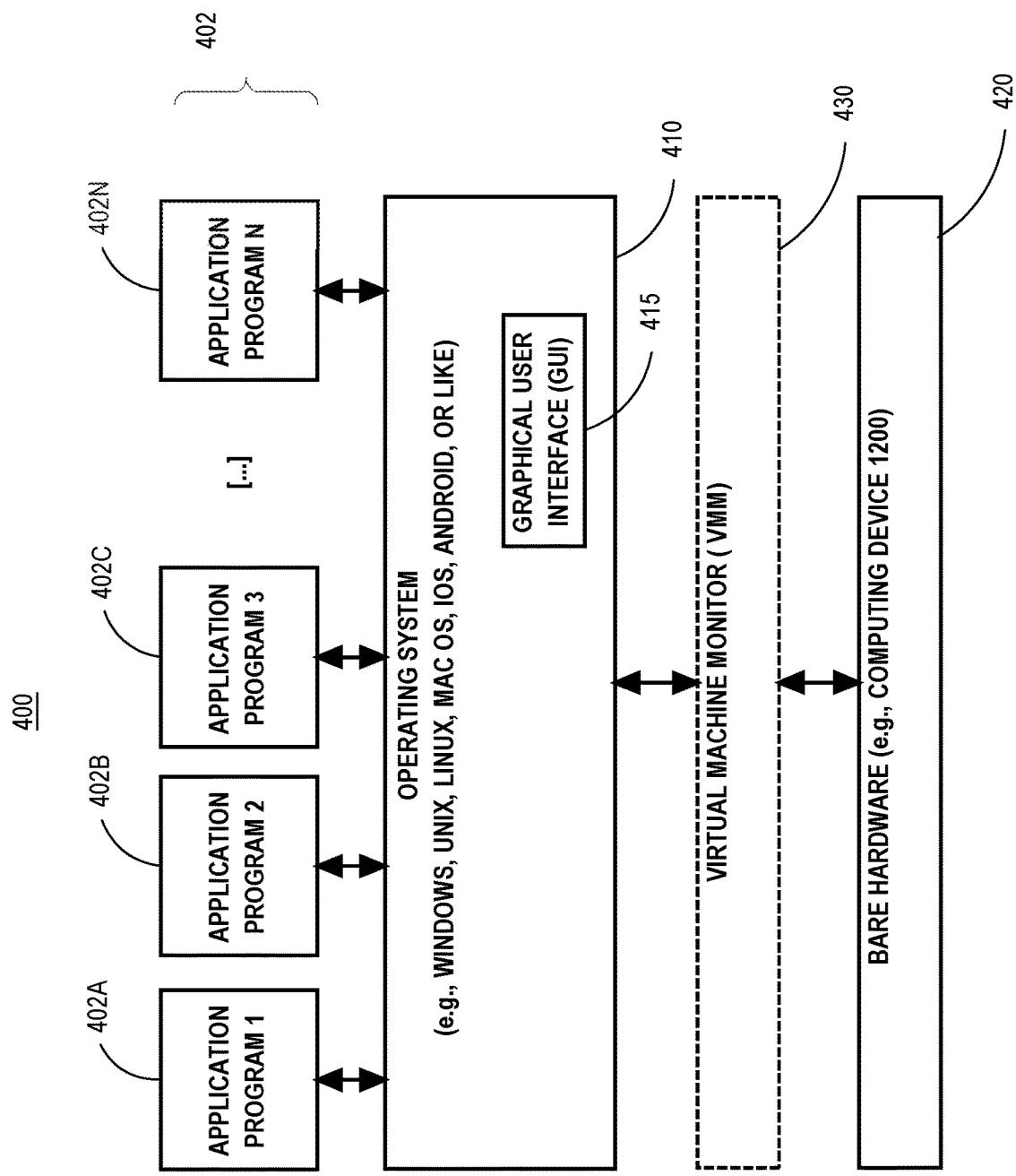
FIG. 4 is a diagram of a software system that may be employed for controlling the operation of a computer system according to an embodiment of the present invention.

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation. In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   receiving, by a compiler executing on a computing device, source code instructions for a program to be compiled, wherein:

the source code instructions include a target expression that includes a target block of code that operates on a graph, and the target expression invokes a particular method call on a particular object type;

identifying, by the compiler, the target expression, within the source code instructions;

determining that the target block of code that operates on the graph is eligible for graph-specific compiler optimization;

generating, by a graph optimized intermediate representation generator, a block of graph-specific intermediate representation instructions to replace the target expression, wherein the block of graph-specific intermediate representation instructions implements the graph-specific compiler optimization;

compiling, by a second intermediate representation generator, the source code instructions to generate intermediate representation instructions, wherein the intermediate representation instructions contain the block of graph-specific intermediate representation instructions, which was generated by the graph optimized intermediate representation generator, that implements the target expression.

2. The method of claim 1, wherein the particular object type is based on an abstract class and the particular method call is an abstract method call defined in a graph optimized application programming interface (API).

3. The method of claim 1, wherein compiling the source code instructions to generate the intermediate representation instructions comprises:

for each subset of subsets of instructions that make up the source code instructions:
identifying whether the subset contains the target expression;
if the subset contains the target expression, inserting the block of graph-specific intermediate representation instructions into the intermediate representation instructions;
if the subset does not contain the target expression, translating the subset into a block of intermediate representation instructions;

compiling the inserted block of graph-specific intermediate representation instructions and the block of intermediate representation instructions to generate the intermediate representation instructions.

4. The method of claim 1, wherein generating the block of graph-specific intermediate representation instructions comprises:

analyzing the target block of code to determine whether the target block of code contains one or more disallowed calls;

upon determining that the target block of code contains at least one of the one or more disallowed calls, causing a compile time error.

5. The method of claim 4, wherein the one or more disallowed calls comprise at least one of a:

try, throw, and catch block,
a for loop,
an enhanced for loop,
a switch statement,
a synchronize statement,
a labeled statement, or
an assert statement.

6. The method of claim 4, wherein the one or more disallowed calls comprise a blacklist of object types that cannot be invoked within the target block of code.

7. The method of claim 1, wherein the block of graph-specific intermediate representation instructions comprises instructions for generating multiple threads for executing the target block of code in parallel.

8. The method of claim 7, wherein the block of graph-specific intermediate representation instructions comprises instructions for handling race conditions within the multiple threads for executing the target block of code in parallel.

9. The method of claim 1, wherein generating the block of graph-specific intermediate representation instructions to replace the target expression comprises:

determining that the target expression contains a first target expression and a second target expression, wherein the first target expression contains a first target block of code and the second target expression contains a second target block of code;

determining that the first target block of code and the second target block of code can be merged into a single for loop; and generating the block of graph-specific intermediate representation instructions to replace the first target expression and the second target expression, wherein the block of graph-specific intermediate representation instructions represents a fused for loop that contains instructions from the first target block of code and the second target block of code.

10. The method of claim 1, wherein the intermediate representation instructions represent bytecode.

11. One or more non-transitory storage media storing instructions which, when executed by one or more computing devices, cause operations comprising:

generating, by a graph optimized intermediate representation generator, a block of graph-specific intermediate representation instructions to replace the target expression, wherein the block of graph-specific intermediate representation instructions implements the graph-specific compiler optimization;

compiling, by a second intermediate representation generator, the source code instructions to generate intermediate representation instructions, wherein the intermediate representation instructions contain the block of graph-specific intermediate representation instructions, which was generated by the graph optimized intermediate representation generator, that implements the target expression.

12. The non-transitory computer-readable media of claim 11, wherein the particular object type is based on an abstract class and the particular method call is an abstract method call defined in a graph optimized application programming interface (API).

13. The non-transitory computer-readable media of claim 11, wherein compiling the source code instructions to generate the intermediate representation instructions comprises:

for each subset of subsets of instructions that make up the source code instructions:
identifying whether the subset contains the target expression;
if the subset contains the target expression, inserting the block of graph-specific intermediate representation instructions into the intermediate representation instructions;
if the subset does not contain the target expression, translating the subset into a block of intermediate representation instructions;

compiling the inserted block of graph-specific intermediate representation instructions and the block of intermediate representation instructions to generate the intermediate representation instructions.

14. The non-transitory computer-readable media of claim 11, wherein generating the block of graph-specific intermediate representation instructions comprises:
    analyzing the target block of code to determine whether the target block of code contains one or more disallowed calls;
    upon determining that the target block of code contains at least one of the one or more disallowed calls, causing a compile time error.

15. The non-transitory computer-readable media of claim 14, wherein the one or more disallowed calls comprise at least one of a:
    try, throw, and catch block,
    a for loop,
    an enhanced for loop,
    a switch statement,
    a synchronize statement,
    a labeled statement, or
    an assert statement.

16. The non-transitory computer-readable media of claim 14, wherein the one or more disallowed calls comprise a blacklist of object types that cannot be invoked within the target block of code.

17. The non-transitory computer-readable media of claim 11, wherein the block of graph-specific intermediate representation instructions comprises instructions for generating multiple threads for executing the target block of code in parallel.

18. The non-transitory computer-readable media of claim 17, wherein the block of graph-specific intermediate representation instructions comprises instructions for handling race conditions within the multiple threads for executing the target block of code in parallel.

19. The non-transitory computer-readable media of claim 11, wherein generating the block of graph-specific intermediate representation instructions to replace the target expression comprises:
    determining that the target expression contains a first target expression and a second target expression, wherein the first target expression contains a first target block of code and the second target expression contains a second target block of code;
    determining that the first target block of code and the second target block of code can be merged into a single for loop; and
    generating the block of graph-specific intermediate representation instructions to replace the first target expression and the second target expression, wherein the block of graph-specific intermediate representation instructions represents a fused for loop that contains instructions from the first target block of code and the second target block of code.

20. The non-transitory computer-readable media of claim 11, wherein the intermediate representation instructions represents bytecode.

* * * * *

UNITED STATES PATENT AND TRADEMARK OFFICE
CERTIFICATE OF CORRECTION

PATENT NO. : 11,379,200 B2
APPLICATION NO. : 16/776792
DATED : July 5, 2022
INVENTOR(S) : Dwars et al.

It is certified that error appears in the above-identified patent and that said Letters Patent is hereby corrected as shown below:

On the Title Page

Column 1, Item (72) under Inventors, Line 1, delete "Kanan" and insert -- Kanton --, therefor.

Column 2, under Assistant Examiner, Line 1, delete "Chenega" and insert -- Cheneca --, therefor.

In the Specification

In Column 6, Line 14, delete "body};" and insert -- body); --, therefor.

In Column 7, Line 65, delete "printlin" and insert -- println --, therefor.

In Column 11, Line 49, delete "of the of the" and insert -- of the --, therefor.

In the Claims

In Column 18, Line 30, in Claim 11, delete "storage" and insert -- computer-readable --, therefor.

Signed and Sealed this
Twenty-seventh Day of December, 2022

Katherine Kelly Vidal
*Director of the United States Patent and Trademark Office*